P. ARBOGAST.
GLASS FURNACE.

No. 180,517. Patented Aug. 1, 1876.

Witnesses
Theo. H. Watterson,
F. A. Pollock

Philip Arbogast, Inventor
By Connolly Bros & McTighe, Attorneys

UNITED STATES PATENT OFFICE.

PHILIP ARBOGAST, OF PITTSBURG, PENNSYLVANIA, ASSIGNOR OF PART OF HIS RIGHT TO FRANCIS T. PLUNKETT AND DOMINICK O. CUNNINGHAM, OF SAME PLACE.

IMPROVEMENT IN GLASS-FURNACES.

Specification forming part of Letters Patent No. 180,517, dated August 1, 1876; application filed May 22, 1876.

*To all whom it may concern:*

Be it known that I, PHILIP ARBOGAST, of Pittsburg, in the county of Allegheny and State of Pennsylvania, have invented certain new and useful Improvements in Furnaces; and I do hereby declare the following to be a full, clear, and exact description of the invention, such as will enable others skilled in the art to which it pertains to make and use it, reference being had to the accompanying drawings, which form part of this specification, in which—

Figure 1:
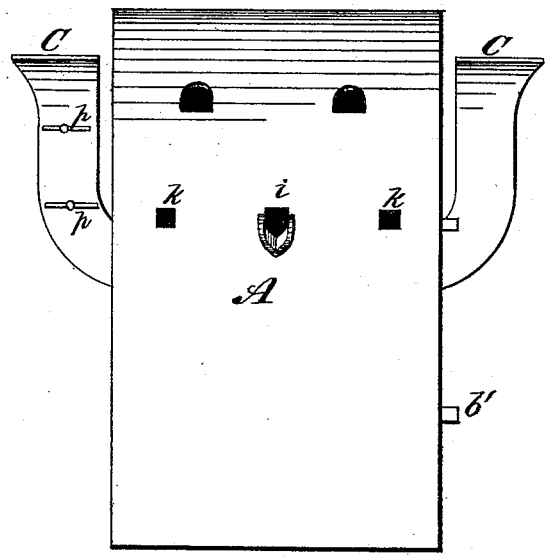
Figure 2:
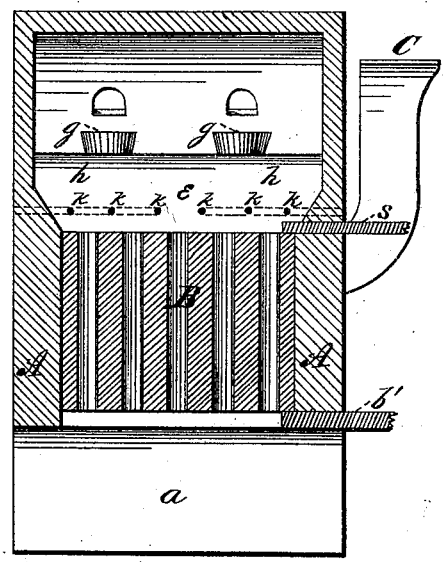
Figure 3:
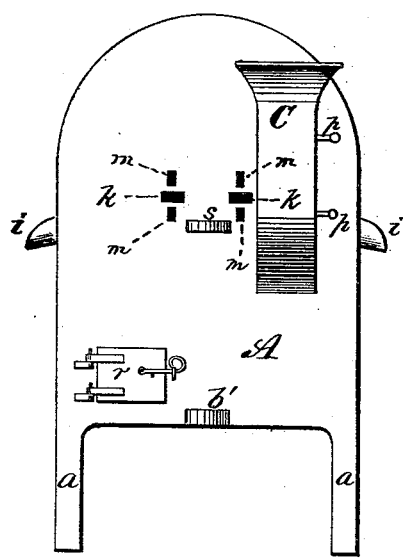
Figure 4:
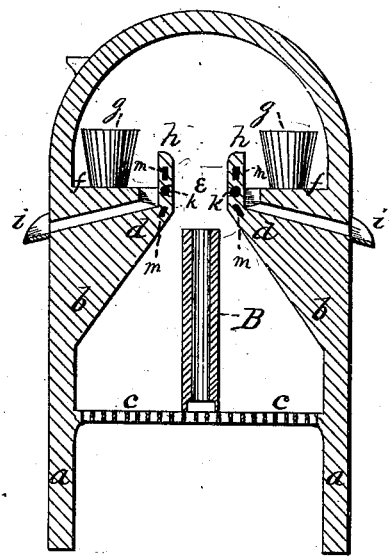

Figure 1 is a side elevation. Fig. 2 is a longitudinal vertical section through the middle. Fig. 3 is an end elevation. Fig. 4 is a transverse middle section.

This invention relates to the construction of furnaces wherein the gas evolved by the partial consumption of the fuel is burned by coming in contact with heated air; and consists in the air-heater, which I construct on the fire-bars, perforated from top to bottom, rising to the throat of the combustion-chamber, open only at top and bottom, and provided with means of regulating the admission of air; and also consists in the construction of the various parts, as hereinafter fully described and claimed.

My furnace may be applied to almost any purpose requiring great heat; but, for the object of illustration, I will describe it as applied to a furnace for making green glass. The principle is alike in all cases, and the means of working substantially similar in every respect.

Referring to the accompanying drawings, A A designate the containing-walls, in which *a a* are the pit-walls; *b b*, the walls of the combustion-chamber, supporting the fire-bars *c;* *d d*, the breast-walls, which are not essential, the whole narrowing to the flue *e*, then continuing upwardly in the banks *f* of the furnace, where the glass-pots *g* are placed. At the brink of banks *f* I construct fire-bridges *h h*, and behind these I hollow or gutter the banks down to an opening, *i*, which communicates with the exterior of the furnace. The object of this channel *i* is to carry off any waste that may get out of the pots, and prevent it getting into the fire. Rising from the middle of the fire-bars, and closed on all sides, but open from end to end by numerous perforations, is a fire-clay air-heater, B, which might be termed an automatic blower. It is perforated or otherwise open from end to end, and, when the fire is burning, cold air is drawn in by the draft and enters the heater B from below, becomes heated, expands, and, of course, rises rapidly by its own lightness. The heater, being vertical, allows the air to follow its natural bent, and thus it assumes, as it were, the form of a moderate blast, and is not brought in contact with the gases until a point is reached where the heat produced can be best applied. The form of the heater B causes the hot air to be projected into the gas in thin sheets or streams, and this at the narrowest part of the combustion chamber, so that all the gas is fed with oxygen to effect complete combustion of the carbon, and the full heat developed by the total consumption of the fuel-products is fairly projected upon the glass-pots or heating-hearth. This air-heater B is constructed separately, and, being placed on top of the grate-bars, can be applied to any furnace as it stands, no change being required but narrowing the flue.

To regulate the supply of air through B, I provide it with a slide or damper, *b'*, below, which opens or closes the perforations at will. In case more air should be needed than the heater B can supply, I provide for its admission by means of further inlets *k*, which penetrate the walls of the furnace from the ends and sides, and open into the flue at its narrow part, feeding air to the flames at about the same point as the heater B. The inlets *k* might, with advantage, be pointed slightly downward at the flue. The intense heat produced will have a tendency to melt or burn out the walls of the flue and bridges. This tendency I propose to neutralize by the cold-air ducts *m*, which pass from end to end through the walls of the flue, but having no communication with the flue whatever. To effect a draft in these ducts, they should be built inclining from one end to another.

Another point in my invention consists in the feeders C, placed at the sides or ends of the furnace. They consist of large pipes, having their lower ends inclined inwardly, and opening into the respective portions of the combustion-chamber, into which they discharge the fuel, and spread it by means of inclined aprons projecting inside. The feeders extend up to hoppers, and have two gates, $p$. The upper gate is opened, when the fuel at once drops and fills the space between the two gates. Then the upper gate is closed and the lower opened, when the charge of fuel is at once thrown down into the furnace, and may be raked or spread through the poke-holes $r$. I provide also a protecting-slide, $s$, on top of the air-heater B, so arranged as to cover any or all of the heater. Its purpose is to protect the perforations when the flue is slaked down with fine coal in order to allow the workmen to get at the glass, for if the flame is ungoverned it will "sting out" through the work-holes in the arch, and prevent the men from access to the glass-pots.

Without in the least altering the principle, my furnace may be made round or other shape; but the parts would have to be arranged to correspond.

Thus constructed, the operation is as follows: The burning fuel in the combustion-chamber gives off its gas, which, being heated, rises; but air is drawn through heater B, becomes heated also, and is projected upon the gas at the flue or throat, being aided, if necessary, in supplying oxygen by the inlets $k$. The intense heat thus produced is carried upward and over the bridges against the glass-pots. Thus I use the immense volumes of carbonic oxide produced by the passage of air through the burning coals, and consequently economize fuel, since I obtain nearly all the heat which is latent in the fuel, and cause little smoke. The result is admirable: the glass is not sulphured, the white heat is produced from the start, and hence less time, by one-half fully, is consumed in raising the heat to the required degree. The walls are kept comparatively cool by the cold-air ducts, and the furnace can be supplied with fuel as often as desired without opening doors anywhere, and thus lowering the heat.

What I claim, and desire to secure by Letters Patent, is as follows:

1. In combination with the heater B, consisting of a perforated structure located within the furnace and above the grate, the dampers $b'$ and $s$, either or both, substantially as set forth.

2. The furnace constructed with a central air-heater, rising from the grate-bars to the narrowed flue, and inclosed within and between the furnace-walls, said heater being provided with means of regulating the supply of air, and delivering the heated air only at the narrowed flue, substantially as described.

In testimony that I claim the foregoing I have hereunto set my hand this 17th day of May, 1876.

PHILIP ARBOGAST.

Witnesses:
   THOS. J. McTIGHE,
   SAMUEL ANDERSON.